May 5, 1964 R. O. GUNDERSON ETAL 3,132,260

FLIP-FLOP CIRCUIT WITH AN INDUCTOR BETWEEN A LOGICAL INPUT CIRCUIT AND THE FLIP-FLOP

Filed July 14, 1961 3 Sheets-Sheet 1

INVENTORS
Robert O. Gunderson
Tom T. Tang

BY Louis A. Kline
John J. Matlago
Richard T. Kengel

Their Attorneys

May 5, 1964 R. O. GUNDERSON ETAL 3,132,260

FLIP-FLOP CIRCUIT WITH AN INDUCTOR BETWEEN A LOGICAL INPUT CIRCUIT AND THE FLIP-FLOP

Filed July 14, 1961 3 Sheets-Sheet 2

INVENTORS
Robert O. Gunderson
Tom T. Tang

BY Louis A. Kline
John T. Matlago
Richard J. Lengel

Their Attorneys

May 5, 1964 R. O. GUNDERSON ETAL 3,132,260

FLIP-FLOP CIRCUIT WITH AN INDUCTOR BETWEEN A LOGICAL INPUT CIRCUIT AND THE FLIP-FLOP

Filed July 14, 1961 3 Sheets-Sheet 3

INVENTORS
Robert O. Gunderson
Tom T. Tang

BY Louis A. Kline
John J. Matlago
Richard J. Rengel

Their Attorneys

United States Patent Office 3,132,260

Patented May 5, 1964

3,132,260
FLIP-FLOP CIRCUIT WITH AN INDUCTOR BETWEEN A LOGICAL INPUT CIRCUIT AND THE FLIP-FLOP

Robert O. Gunderson, Torrance, and Tom T. Tang, Los Angeles, Calif., assignors to The National Cash Register Company, Dayton, Ohio, a corporation of Maryland Filed July 14, 1961, Ser. No. 124,205
9 Claims. (Cl. 307—88.5)

Figure 1:
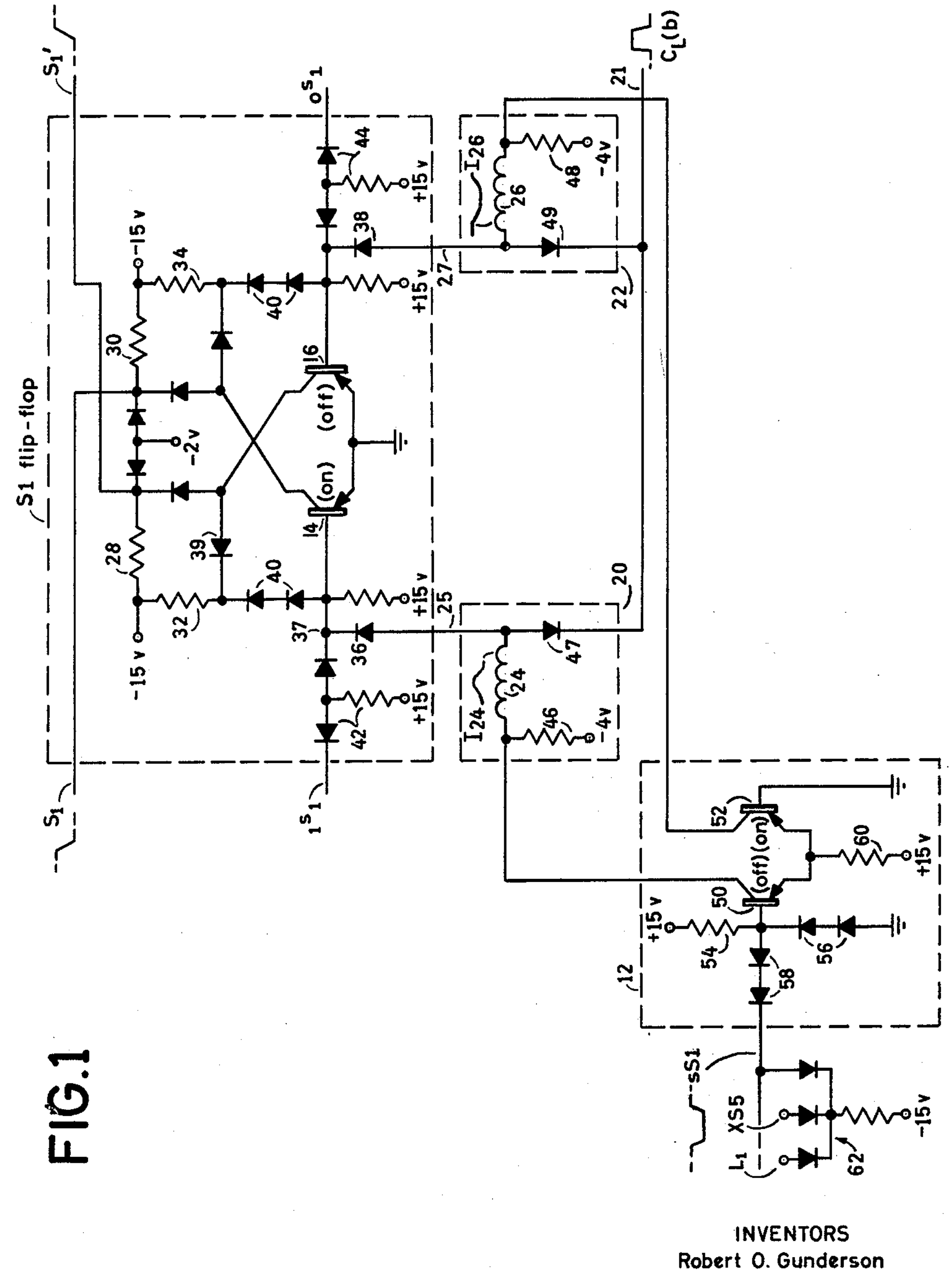

The present invention is directed to flip-flop circuit arrangements and more particularly, to improved circuit arrangements for controlling the triggering of flip-flop circuits.

In the control of a flip-flop or Eccles-Jordan bistable multivibrator, a primary requisite is to prevent retriggering, i.e., two changes of state occurring during a single gating or clock pulse. In many instances, the output of one flip-flop forms a part of the logic which drives the input of another flip-flop. Consequently, when a logical clock pulse occurs which operates to gate the logical input to trigger one flip-flop, the changing of the flip-flop output may modify the input logic to its own input or to another flip-flop where the flip-flops are interconnected by logical circuitry. The modified input logic may determine the state of the flip-flop, i.e., cause retriggering, in the absence of control as provided by the present invention. The input logic to interconnected flip-flops may be modified by the changing output of a fast operating flip-flop during the predetermined operating time interval (duration of the clock pulse) provided for all flip-flops. The duration of the operating time interval is predetermined by the operating time interval of the slowest operating flip-flop in a group of interconnected flip-flops. As a result, the faster operating flip-flops will modify the input logic to other flip-flops before the end of the predetermined operating time interval. Further, possible differences in timing of clock pulses would cause flip-flops supplied by early clock pulses to have outputs modifying the input logic during the operating time of interconnected flip-flops. The logical clock pulse referred to above is a timing signal produced by a pulse generator to sense logical situations at a periodic rate wherein the time between clock pulses is usually long compared to the pulse duration. The improved circuit arrangement of the present invention provides for controlling flip-flops in a manner which prevents retriggering while providing features which overcome the disadvantages of prior circuit arrangements of this type.

In general, the preferred flip-flop circuit arrangement of the present invention comprises a diode coupled flip-flop having a pair of separate triggering inputs and a clock gating circuit for each triggering input. Logical signals are coupled to both clock gating circuits by a single logical input circuit having a separate output circuit for each clock gating circuit. In accordance with the preferred embodiment of the present invention, each clock gating circuit includes an inductance for storing energy prior to the occurrence of the logical clock pulse, which energy is discharged during the clock pulse to trigger the flip-flop. The terms "charge" and "discharge," as used herein, refer to the storing of energy in the inductance and the release of energy from the inductance, respectively. The single input circuit controls the supply of current to either one inductor or the other inductor of the clock gating circuits prior to the clock pulse according to the low (true) or high (false) potential level of the logical signals coupled to the single input circuit from a logical circuit. Each clock gating circuit has a clock input which completes the current paths through the inductors in the absence of a logical clock pulse. During the logical clock pulse, the current paths to the clock input are blocked and the energy stored in the charged inductor is discharged to produce a triggering signal which is fed into the respective triggering input to trigger the flip-flop into a state corresponding to the logical signal at the single input circuit. In blocking the current paths through the inductors during the clock pulse the logical signal and particularly changes in the logical signal will not effect the triggering of the flip-flop. In this manner, improved circuit arrangements are provided controlling the triggering of flip-flops to store a true or false logical signal or their binary number equivalents.

Storage of logical signals in flip-flops is required in various electronic equipment and particularly in electronic data processors or computer systems in which a single computer often requires as many as a hundred or more of these circuit arrangements, primarily for the storage of true and false signal outputs of logical circuits, an example of such a computer is disclosed in a copending U.S. patent application of Robert O. Gunderson et al., filed on May 2, 1961, Serial No. 107,109, entitled Computer System. In view of the large number of flip-flop circuits required in computers and in other electronic equipment, it is extremely advantageous to provide an economical flip-flop circuit arrangement which is capable of providing reliable operation at the high speeds required in the equipment, for example, at a speed of two megacycles in the computer system described in the above cited patent application. An economical flip-flop circuit arrangement is considered to be a circuit arrangement which provides reliable operation at two megacycles using transistors and other circuit components whose operating characteristics may vary slightly due to aging or varying load conditions. Further, it is desirable to provide a flip-flop circuit arrangement which is capable of operating reliably in the presence of extraneous signals coupled to it in its environment and is capable of tolerating distortion in the input signals controlling the flip-flop operation.

It is an object of the present invention, therefore, to provide a flip-flop circuit arrangement having the foregoing features and advantages.

Another object of the present invention is the provision of a flip-flop circuit arrangement which avoids retriggering.

A further object is to provide triggering of a transistor flip-flop by gating an electrical current supplied by energy stored in an inductance.

Still another object of the present invention is to provide for triggering a flip-flop into either one or the other of two logical states corresponding to the potential level of a logical signal at a single logical input for the flip-flop by steering an electrical current supplied by energy stored in either one or the other of two inductances.

Another object of the present invention is to provide a flip-flop circuit arrangement to selectively pass an electrical current through either one or the other of a pair of inductors according to a true or false logical potential level of a signal supplied from a logical circuit, and thereafter block the passage of current through both inductors to discharge the energy stored in the selected inductor to trigger the flip-flop into a state corresponding to the logical potential level of the logical circuit.

Figures 1A, 2:
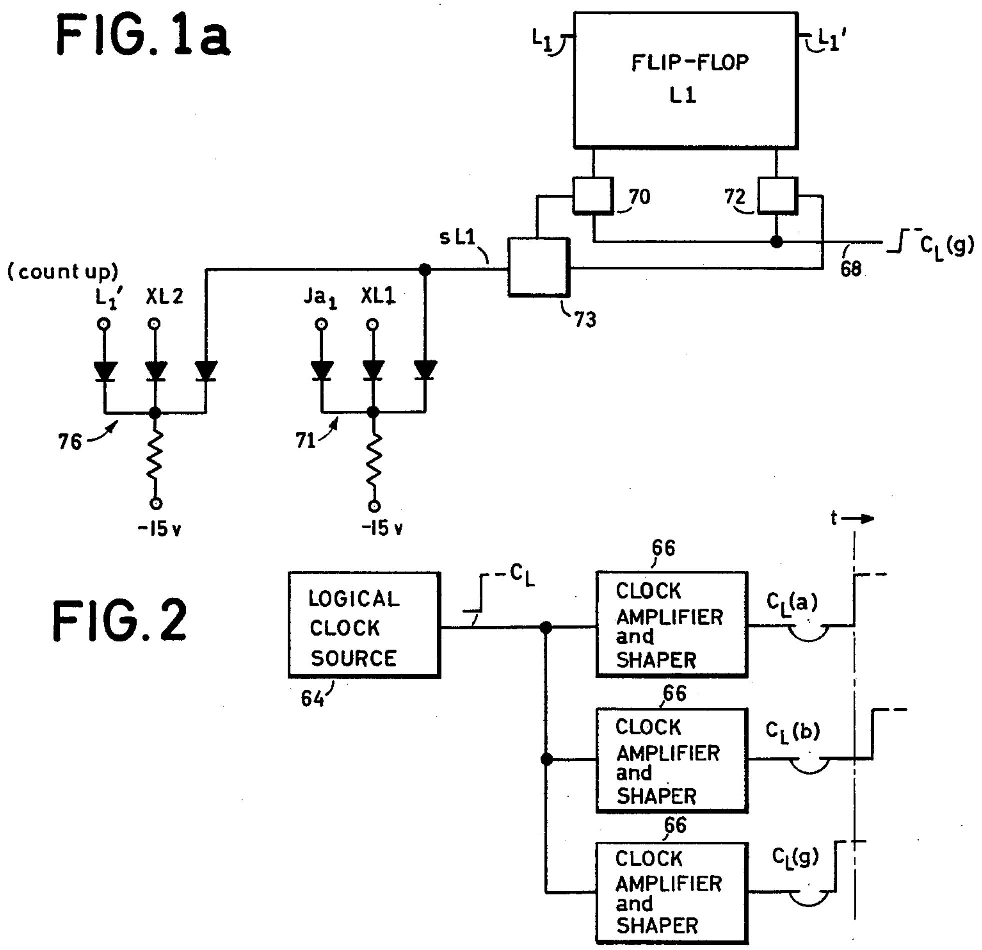
Figure 3:
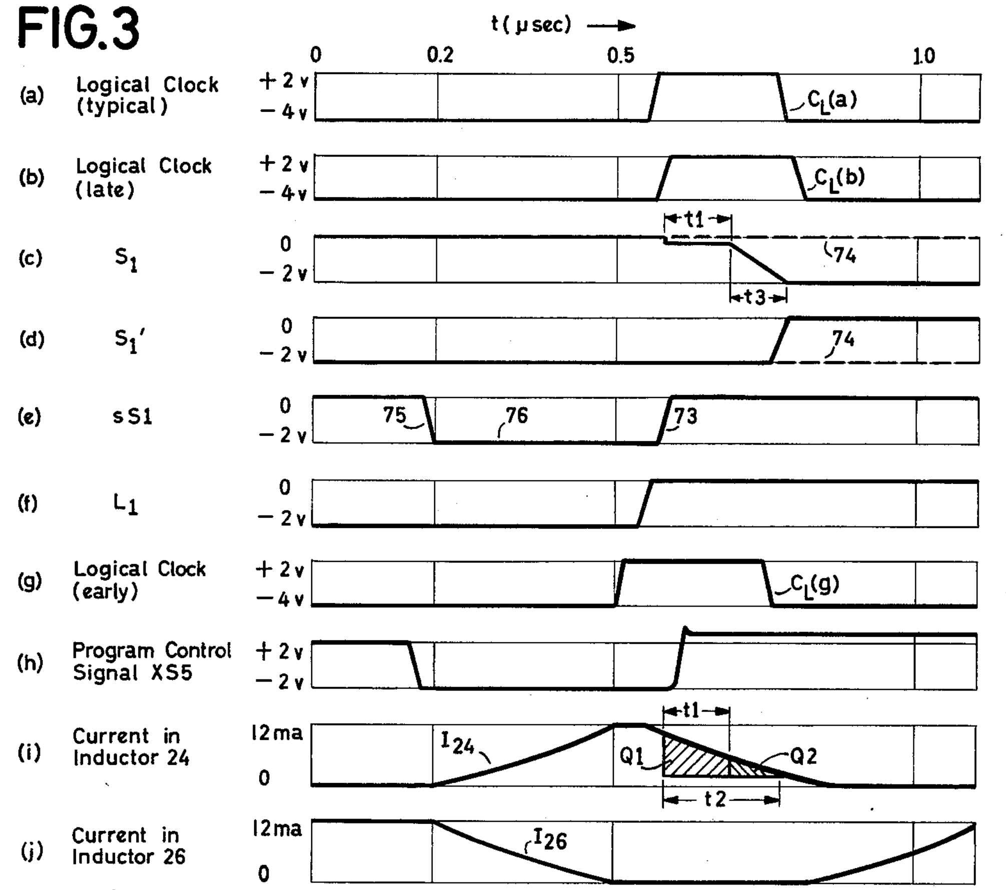
Figure 4:
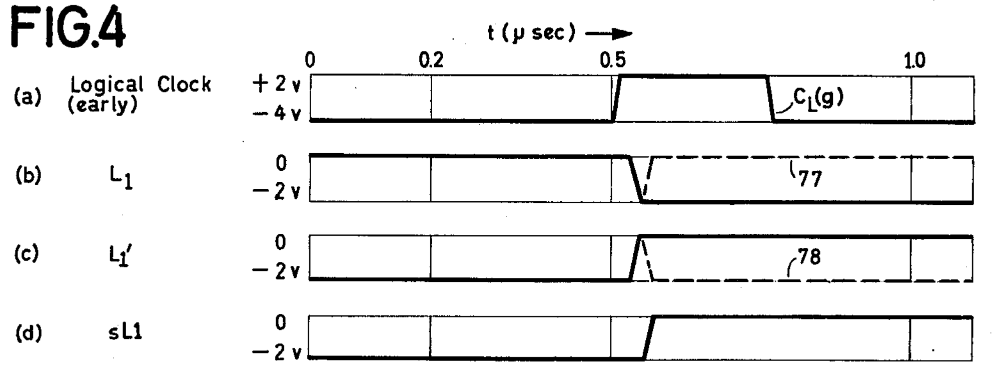

Other objects and features of the invention will become apparent to those skilled in the art as the disclosure is made in the following detailed description of a preferred embodiment of the invention as illustrated in the accompanying sheets of drawings, in which:

FIG. 1 is a circuit diagram of the flip-flop circuit arrangement of the preferred embodiment of the invention and a typical logical network coupled to the single logical input of the flip-flop;

FIG. 1*a* is a block diagram of another flip-flop circuit arrangement similar to the circuit arrangement of FIG. 1 and is shown to illustrate the operation of the present invention interconnected in a logical circuit;

FIG. 2 is a block diagram of a source of logical clock pulses and is shown to illustrate the operation of the present invention; and FIGS. 3 and 4 illustrate various voltage and current waveforms produced in the operation of the present invention.

Referring now to the drawings, there is shown in FIG. 1 which illustrates the preferred embodiment, a flip-flop S1 having a single input circuit 12 and clock gating circuits 20 and 22 which are required to trigger the flip-flop S1 into a true or false state according to the potential level of a logical signal at a single logical input *s*S1. The flip-flop S1 has an output $S_1$ and an inverted output $S_1'$. Additional inputs, a set input $_1s_1$ and a reset input $_0s_1$, are provided for triggering the flip-flop S1 directly into a true or false state, respectively. A triggering pulse (+2 v.) applied to the set input $_1s_1$ or the reset input $_0s_1$ triggers the flip-flop S1 into its true or false state, respectively, such that the output $S_1$ is at a low or high level logical potential (—2 v. or 0 v.), respectively.

In addition to the set and reset inputs $_1s_1$ and $_0s_1$, flip-flop S1 also has triggering inputs 25 and 27 for triggering the flip-flop S1 into its true or false state, respectively, when a logical clock $C_L(b)$, FIG. 3(*b*), appears at clock gating circuits 20 and 22. The single input circuit 12 comprises a differential amplifier circuit having separate outputs for producing a current in either the clock gate 20 or clock gate 22 in response to the low or high logical potentials, respectively, which are coupled to the logical input *s*S1. If, as shown in FIG. 1, a false signal is applied to the logical input *s*S1 at the beginning of operation, then PNP transistors 50 and 52 are "turned off" and "turned on," respectively. A false signal of a high level logical potential (0 v.) applied to the logical input *s*S1 "turns off" the transistor 50 which raises the voltage at the emitter of transistor 52 "turning on" transistor 52 to supply current to an inductor 26 in the clock gate 22. A true signal of a low level logical potential (—2 v.) applied to the logical input *s*S1 is coupled to the differential amplifier circuit 12 which "turns on" the transistor 50 directly by the negative voltage applied to its base to supply current to an inductor 24 in the clock gate 20. As a result, the voltage at the emitter of the transistor 52 is lower "turning off" transistor 52. On the appearance of the logical clock pulse $C_L(b)$, the current paths through the inductors 24 and 26 to a clock input 21 are blocked by the high level clock pulse $C_L(b)$. Blocking the current paths through the inductors causes the inductor previously passing current to discharge the energy stored therein to produce a triggering current which is steered into the respective triggering input 25 or 27 and the base-emitter circuit of flip-flop transistor 14 or 16 (PNP type), respectively. The current produced in the base-emitter circuit of either transistor 14 or 16 triggers the flip-flop into the true or false state, respectively, or permits the state to remain unchanged if the flip-flop is already in the proper state.

Having considered the flip-flop circuit arrangement generally, the individual circuits shown in FIG. 1 will be considered in detail. The diode coupled flip-flop S1 comprises a pair of cross-coupled transistor current switching circuits in which the transistors 14 and 16 are alternately driven into saturation during operation. Collector load resistors 28 and 30 connect the respective collectors of transistors 16 and 14 to the collector supply voltage of —15 volts through diodes, as shown, to provide the required load current. The outputs $S_1$ and $S_1'$ are limited in their negative excursions to —2 volts by diodes connecting the outputs to a —2 volt source, as shown. Separate base current resistors 32 and 34 connect the base-collector circuits to the —15 volt collector supply voltage, as shown.

Individual pairs of voltage level shifting diodes 40, shown connected in the cross-coupling circuits, adjust the voltage level at the bases of transistors 14 and 16 to approximately +0.5 volt to provide a reverse bias across the base-emitter junctions for "latching" the flip-flop S1.

Input networks 42 and 44 are provided for the set input $_1s_1$ and reset input $_0s_1$, respectively. The signals coupled to the set input $_1s_1$ and reset input $_0s_1$ are positive going triggering pulses. Triggering pulses applied to either the input network 42 or 44 are coupled to the base of the transistor 14 or the base of the transistor 16, respectively, to either turn the respective transistor off or maintain it off, depending upon its state.

Referring now to the clock gating circuitry for flip-flop S1 shown in FIG. 1, the inductors 24 and 26 are provided in clock gates 20 and 22, respectively, to store energy temporarily for triggering the flip-flop S1 into its true state or its false state, respectively. The energy stored in either inductor 24 or 26 is supplied by the current outputs of the differential amplifier circuit 12 which is controlled by the true or false logical signals at the logical input *s*S1. The time period of the current rise or fall in inductors 24 and 26 is controlled by the L/R time constant of the inductors connected in parallel with resistors 46 and 48, respectively, which are connected to a —4 volt source as shown. Typical current waveforms $I_{24}$ and $I_{26}$ illustrated in FIGS. 3(*i*) and 3(*j*) show a preferred current rise or fall time of 0.3 microsecond and a maximum amplitude of 12 milliamperes which is within the current rating of the PNP junction transistors 50 and 52 in their active region of operation. The PNP transistors 50 and 52 are operated in their active region in order to provide for the switching time required in the operation of flip-flop S1.

The clock input 21 is connected to the inductors 24 and 26 by diodes 47 and 49, respectively, to provide current paths through the inductors between clock pulses. As soon as the clock pulse $C_L(b)$ rises above ground potential, a reverse bias is placed on the diodes 47 and 49 to block the primary current path through the inductor steering the discharging current from either one or the other of the inductors 24 or 26 into the triggering inputs 25 or 27, respectively.

The current steered into the base-emitter circuit of either transistor 14 or 16 is the signal current for triggering the flip-flop S1 into the true or the false state according to the low (true) or high (false) potential level, respectively, at the logical input *s*S1 prior to the clock pulse $C_L(b)$ (FIG. 3(*b*)). Only one of the inductors 24 or 26, which corresponds to the true or false signal at the logical input *s*S1, is conducting current supplied from the differential amplifier 12 during the time interval of 0.3 microsecond immediately prior to the logical clock pulse $C_L(b)$. Resistors 46 and 48 provide alternate current paths for the current supplied from the outputs of the differential amplifier 12 in a manner set forth later on in the description of the operation.

The differential amplifier circuit 12, as shown in FIG. 1, comprises a pair of PNP junction transistors 50 and 52 having collector output load circuits (clock gates) 20 and 22, respectively, an input circuit connected to the logical input *s*S1, and an emitter circuit. The logical signals are applied to the logical input *s*S1 and coupled to the base of transistor 50 to control the collector load current to supply current to either inductor 24 or 26. The input circuit connecting the base of transistor 50 to the logical input *s*S1 includes a resistor 54 connecting the base to a +15 volt supply source which supplies the current to a logical circuit including a logical network 62. The +15 volt source and the resistor 60 provide a substantially constant current source which can be steered into either transistor 50 or 52 by the potential variations produced by logical signals coupled to the base of transistor 50. The lower voltage level of reverse bias across the base-emitter junction is adjusted above ground by a pair of voltage level shifting diodes 56 connected in series while the signal level at the logical input *s*S1 is adjusted by voltage level shifting diodes 58. The transistor 50 is "turned on" directly by a low level potential at its base produced by low level (true) logical potential at the logical input *s*S1. During the time period transistor 50 is "turned on," the current supplied from the emitter circuit is steered through transistor 50, and the bias across the base-emitter junction of the transistor 52 is reversed, if the level at the base of the transistor 50 is maintained at or below ground potential. In the present arrangement, potential levels of −0.3 volt at the base of transistor 50 will steer the current from the emitter circuit into transistor 50 and +0.3 volt at the base of transistor 50 will steer the current into transistor 52. When transistor 50 is "turned off" by a high level "false" logical potential at the logical input *s*S1, transistor 52 is "turned on" as the base-emitter junction of transistor 52 is permitted to "ride above ground" by the base-emitter potential produced by the current steered into the transistor 52.

In the description of the operation of the flip-flop circuit arrangement shown in FIG. 1, the operational conditions described and illustrated by the signal waveforms in FIG. 3 are those conditions which would tend to induce retriggering of the flip-flop S1 as a result of the change of the potential level of the signal from true to false during the clock pulse $C_L(b)$. Also, it should be noted that the time intervals allowed for recovery of transistors and other time periods, as shown by the signal waveforms, are illustrative, and as indicated may vary for different transistors, circuit components, and load conditions which are commonly found in electronic equipment.

In order to provide a clear understanding of the operation of the flip-flop circuit arrangement shown in FIG. 1, it will be assumed the flip-flop S1 is in its false state and the transistor 14 is "turned on" and the transistor 16 is "turned off." A true (low potential) signal is coupled to the logical input *s*S1 at the time of the logical clock pulse $C_L(b)$. A true logical signal applied to the input *s*S1 is provided by a logical network 62 having inputs $L_1$ and XS5. The logical network 62 is a conventional diode "and" gate for providing low potential level (true) logical signals and high potential level (false) logical signals at the logical input *s*S1 and includes a product diode for each input and a summing diode coupled to a negative current supply (−15 volt source) through a current limiting resistor. One of the inputs of the logical network 62 is coupled to the output $L_1$ of the flip-flop L1 shown in FIG. 1*a*. The other input of network 62 is coupled to a source of a program control signal XS5 which source has not been shown since it is unnecessary in the description to provide an understanding of the system, however, the signal waveform has been illustrated in FIG. 3(*h*).

In FIG. 2, the circuit arrangement for supplying the clock pulses $C_L(a)$, $C_L(b)$, and $C_L(g)$ has been shown in block form. The circuit arrangement is shown to include a single logical clock pulse source 64 producing logical clock pulses $C_L$ for sensing logical conditions at a periodic rate wherein the time between logical clock pulses $C_L$ is usually long compared to the pulse duration. In order to supply all of the clock gates for the various flip-flops, flip-flops S1 and L1 being typical, a plurality of clock amplifiers and shapers 66 are provided having separate clock pulse outputs providing logical clock pulses $C_L(a)$, $C_L(b)$, and $C_L(g)$. In order to illustrate the manner in which retriggering is avoided, the time delays of the individual clock amplifier and shapers 66 are assumed to be different to produce logical clock pulses $C_L(a)$, $C_L(b)$, and $C_L(g)$. In general, the timing of the logical clock pulse coupled to a clock input (e.g. clock input 21) is such that the clock pulse must rise from −4 v. to at least ground potential, before the logical potential level changes at the logical input, in order to avoid possible retriggering as will be apparent later from the description. Therefore, it can be stated that the latest logical clock pulse must appear at the clock input of a flip-flop before the logical potential level at the logical input changes at the same flip-flop, if the possibility of retriggering is to be avoided. The logical clock pulse $C_L(a)$ is a typical or average clock pulse wherein the rise in voltage occurs approximately midway between the rise of a late clock pulse $C_L(b)$ and the rise of an early clock pulse $C_L(g)$. In order to illustrate the operation of the flip-flop circuit arrangement of the present invention which avoids retriggering, the late logical clock pulse $C_L(b)$ is applied to the clock input 21 for flip-flop S1 and coupled therefrom to the clock gates 20 and 22; and the early logical clock pulse $C_L(g)$ is applied to the clock input 68 and coupled to the clock gates 70 and 72 for the flip-flop L1 shown in FIG. 1*a*. The flip-flop L1 is assumed to be initially in a true state as illustrated by the output $L_1$ waveform in FIG. 3(*f*), and the true state of flip-flop L1 is to be changed to false as the output of a logical network 71 has changed to false and the outputs of all other logical networks coupled to the logical input *s*L1 are false. The early logical clock pulse $C_L(g)$, applied to the clock input 68 and clock gates 70 and 72 is effective to trigger the flip-flop L1 from a true state to a false state to correspond to a high potential level (0 v.) at the logical input *s*L1 and produce an early change in logical potential level from low to high at the output $L_1$ (FIG. 3(*f*)) and the logical input *s*S1 as indicated by the voltage rise 73 of the waveform shown in FIG. 3(*e*). It should be noted, as clearly explained later in the specification, that this early change, however, has no effect on flip-flop S1 since the late clock pulse $C_L(b)$ has already blocked the current paths through the inductors. In addition to the clock pulse $C_L(g)$ occurring early, it is assumed the flip-flop L1 has a short switching time (approximately .05 microsecond) to provide the earliest change in the potential level from low to high of the output $L_1$ and the earliest change in the potential level of the signal applied to the logical input *s*S1 resulting in the rise in voltage 73 of the signal applied to the logical input *s*S1 (FIG. 3(*e*)). The fall in voltage 72 at 0.2 microsecond shown by the waveform in FIG. 3(*e*) illustrates the latest prior change in the potential level of the logical signal coupled to the logical input *s*S1 to provide a 0.3 microsecond time interval for the rise in current in the inductor 24 prior to the earliest clock pulse at 0.5 microsecond. The time period of 0.3 microsecond corresponds to the L/R time constant of the parallel inductor-resistor networks in the clock gates 20 and 22 and the time required for the rise or fall of the current $I_{24}$ and $I_{26}$, respectively (FIGS. 3(*i*), and 3(*j*)).

The following description is a detailed discussion of the triggering of the flip-flop S1 from a false state to a true state. The transistor 50 in the differential amplifier circuit 12 is "turned on" by the low logical potential level (true) signal 76 (FIG. 3(*e*)) applied to the logical input *s*S1 and coupled to the base of the transistor 50. In the "on" state, the transistor 50 provides a constant current source of approximately twelve milliamperes. Under these conditions, a current path is provided in the collector circuit of transistor 50 to the clock input 21 through the inductor 24 and the diode 47. As the current builds up in the collector circuit of the transistor 50, the collector current first supplies the resistive load (resistor 46) in the parallel inductor-resistor network of the clock gate 20. The initial high impedance of the inductor 24 decreases with time and the inductive load becomes effective as the current $I_{24}$ (FIG. 3(*i*)) increases through the inductor 24 at a rate determined by the time constant of the parallel inductor 24 and resistor 46 network. The current $I_{24}$ through the inductor 24 continues at a level determined by the transistor 50 until the clock pulse $C_L(b)$ (FIG. 3(*b*)) arrives at the clock input 21. The clock pulse $C_L(b)$ blocks the current path through the diode 47 when the level of the clock pulse rises above ground potential and to the maximum clock pulse potential level of +2 volts. During the time period of the clock pulse $C_L(b)$, the current supplied from transistor 50 flows through resistor 46 and the current discharging from the inductor 24 is steered into the base-emitter circuit of the transistor 14 through input 25 and diode 36. The voltage level at node 37 is equal to the base-emitter voltage drop (to ground) of the transistor 14 when the transistor 14 is "turned on." The rate of decrease in the inductor current $I_{24}$ in the inductor 24 when the path through diode 47 is blocked by the clock pulse $C_L(b)$ is determined by the time constant of the parallel network of the inductor 24 and resistor 46 and the input impedance of the transistor 14 while it is "turned on," i.e., base-emitter impedance.

The portion of the current $I_{24}$ which is steered into the base-emitter circuit of transistor 14 during the clock pulse $C_L(b)$ is effective to "turn off" the transistor 14 and maintain it non-conductive until transistor 16 "turns on" and the collector current of transistor 16 rises to raise the voltage cross-coupled to the base of transistor 14 through diodes 39 and 40. This complete cycle of operation is commonly referred to as regeneration. The energy required for "turning off" transistor 14 and maintaining it "off" until transistor 16 "turns on" is illustrated in FIG. 3(*i*) by charges Q1 and Q2, respectively. The time *t*1 is the storage time in which the base current is reduced to zero or the base-emitter current is reversed and the decay time *t*3 (see FIG. 3(*c*)) begins when the transistor 14 begins operating in its active region. The voltage at output $S_1$, during the storage time *t*1, remains at substantially the same level as shown in FIG. 3(*c*). The time period *t*3 is the RC time constant of the load coupled to the output $S_1$. The total time *t*2 is the time required for regeneration and the time required to change the logical potential level at output $S_1$ from a high (false) potential level to a low (true) potential level.

From the foregoing description of the operation, it should be noted that retriggering has been avoided by storing energy required for triggering the flip-flop S1 in the inductor 24 to produce a triggering signal upon the arrival of the late clock pulse $C_L(b)$. It should be noted that the clock pulse $C_L(b)$ occurred prior to any changes in the logical input. This is because the time difference between an early and late clock is less than the time required for a flip-flop to be triggered in response to a clock pulse. During the 0.3 microsecond time period (0.2 to 0.5 microsecond) the inductor 24 is charging and the inductor 26 is discharging. The energy in inductor 26 at 0.2 microsecond resulted from the false signal at the logical input *s*S1 prior to 0.2 microsecond. In this manner, only the inductor 24 in the clock gate 20 is charged when the clock pulse $C_L(b)$ arrives to trigger the flip-flop S1 into the true state which corresponds to the low potential level at the logical input *s*S1 as illustrated by the voltage waveforms of output S1 and logical input *s*S1 in FIGS. 3(*c*) and 3(*e*) and current waveforms $I_{24}$ and $I_{26}$ in FIGS. 3(*i*) and 3 (*j*). The discharging of inductor 24 begins when diode 47 is blocked by the clock pulse $C_L(b)$ as shown by the current waveform $I_{24}$ in FIG. 3(*i*). The energy stored in inductor 24 which is available to supply required current to "turn off" transistor 14 is indicated by Q1 in FIG. 3(*i*) where Q1 (pico-coulombs)$=I_{24}$ (milliamperes) *t*1 (microsecond). The remaining energy stored in inductor 24, indicated in FIG. 3(*i*) by Q2, produces the required current to transistor 14 to maintain it "turned off" until flip-flop S1 has "latched."

The clock gates 20 and 22 provides a delay which prevents retriggering during the time interval of the clock pulse $C_L(b)$. As illustrated in FIG. 3(*e*) and indicated by the voltage rise 73, the signal at the logical input *s*S1, as a result of flip-flop L1 being triggered by an early logical clock $C_L(g)$, changes from a low potential level (true) to a high potential level (false) immediately after the rise in voltage of the clock pulse $C_L(b)$. The change in potential level at the logical input *s*S1 is effective to "turn off" the transistor 50 in the differential amplifier 12 which "turns on" the transistor 52 and the transistor 52 conducts to supply current to clock gate 22. However, since the current path through the inductor 26 and diode 49 is blocked during the time period of the clock pulse $C_L(b)$ (FIG. 3(*b*)), the current flows through the resistor 48, and the inductor 26 is not conducting current or charging during the clock pulse $C_L(b)$, as illustrated by the current waveform $I_{26}$ in FIG. 3(*j*). In the absence of current in the inductor 26, no current or triggering signal is applied to triggering input 27 during the clock pulse $C_L(b)$ in the cycle of regeneration under consideration. Thus, retriggering of the flip-flop S1, by early triggering of flip-flop L1, is avoided by inductively storing energy in the inductor 24 corresponding to the logical potential level of the signal at the logical input during a 0.3 microsecond time interval prior to the logical clock $C_L(b)$; and triggering the flip-flop during the clock pulse $C_L(b)$by the signal current provided by the energy stored in inductor 24. Any change in potential level of the signal at the logical input *s*S1 which occurs after the rise of the logical clock pulse $C_L(b)$ and until the clock pulse $C_L(b)$ falls, is ineffective to retrigger or control the state of flip-flop S1 to produce outputs $S_1$ and $S_1'$ indicated by the dotted lines 74 in FIGS. 3(*c*) and 3(*d*). Further, the time duration of the clock pulse $C_L(b)$ is not critical and it may remain at the high level without causing retriggering.

The foregoing is a complete description of a regeneration cycle of flip-flop S1 in which the state of the flip-flop S1 is changed from a false state to a true state to correspond to the low potential level (true) signal at the logical input *s*S1. Changing of the flip-flop S1 from a true state to a false state follows the same general sequence wherein the differential amplifier 12 supplies current to store energy in the inductor 26 in the 0.3 microsecond time interval prior to the clock pulse $C_L(b)$. The energy stored in the inductor 26 is discharged during the clock pulse $C_L(b)$ to produce a triggering signal for "turning off" transistor 16 and maintaining it "off" until flip-flop S1 is "latched," i.e., transistor 14 "turns on" to raise the voltage cross-coupled to the base of transistor 14 through diodes 40.

In FIG. 4, voltage waveforms for the flip-flop L1 are shown to illustrate the operation of the flip-flop circuit arrangement of the present invention which avoids retriggering of the flip-flop L1 when "count up" logic is performed. During the performance of "count" logic, a number stored in a flip-flop or register is increased or decreased according to the logic to be performed. This operation is illustrated by the operation of flip-flop L1 by the "count up" logical network 76 for flip-flop L1 shown in FIG. 1*a*. The flip-flop L1, clock gates 70 and 72 and differential amplifier 73 are the same as the corresponding circuits shown in detail in FIG. 1 for flip-flop S1.

In operation, the state of flip-flop L1 is changed from the false state to the true state to store a binary 1 in the performance of "count up" logic. The signal at the logical input *s*L1 (FIG. 4(*d*)) is at a low potential level (true) since both inputs $L_1'$ and XL2 to the logical network 76 are assumed to be at a low logical potential level. The input XL2 is the program control signal input for "count up" logical program control signal XL2 which is similar to the program control sginal XS5 (FIG. 3(*h*)). The flip-flop L1 is triggered into its true state by the true signal at the logical input *s*L1 which state exists prior to the early logical clock pulse $C_L(g)$, as illustrated by the voltage waveforms of the outputs $L_1$ and $L_1'$ in FIGS. 4(*b*) and 4(*c*). As a result, the input $L_1'$ of network 76 changes from a low to a high logical potential and the signal at the logical input *s*L1 changes from a low to a high logical potential as shown by the voltage wavefrom in FIG. 4(*d*). The clock gating circuit 70 is not responsive to the high potential at the logical input *s*L1 to produce a triggering signal during the clock pulse $C_L(g)$, whereby retriggering, in response to the high potential level at logical input *s*L1 to produce outputs $L_1$ and $L_1'$ as indicated by the dotted lines 77 (FIG. 4(*b*)) and 78 (FIG. 4(*c*)), is avoided.

In the light of the above teachings, various modifications and variations of the present invention are contemplated and will be apparent to those skilled in the art without departing from the spirit and scope of the invention. For example, if desired, NPN transistors can be used instead of the PNP transistors as shown and described in the preferred embodiment. Also, a flip-flop which is supplied a negative clock pulse (not shown) instead of a positive clock pulse $C_L(b)$, as shown in FIG. 3(*b*), will be triggered at the trailing edge of the negative clock pulse wherein either one or the other of the clock gates are charged during the negative clock pulse $C_L$.

What is claimed is:

1. A flip-flop circuit arrangement comprising: flip-flop circuit means including a first transistor and a second transistor; logical input circuit means having a single input circuit and first and second output circuits, said logical input circuit means being responsive to true and false logical signals coupled to said single input circuit to produce an electrical current in said first or second output circuit, respectively; first and second gating circuit means separately coupling said first and second output circuits to said first and second transistors, respectively, each of said gating circuit means including an inductive network including an inductive element; and gating pulse input circuit means coupling said inductive elements to a source of gating pulses for controlling the current path through each of said inductive elements from the respective output circuits to said source, whereby energy stored in either one inductive element or the other inductive element is discharged into the respective transistor for triggering the flip-flop circuit means.

2. A flip-flop circuit arrangement comprising: flip-flop circuit means including a first transistor and a second transistor; a differential amplifier having a single input circuit and first and second output circuits, said differential amplifier being responsive to true and false logical signals coupled to said single input circuit to produce an electrical current in said first or second output circuit, respectively; first and second gating circuit means individually coupling said first and second differential amplifier output circuits to said first and second transistors, respectively, each of said gating circuit means including an inductive network including an inductive element and a resistive element connected to the respective differential amplifier output circuit; and clock pulse input circuit means connecting said inductive elements to a source of clock pulses for blocking the current path through each of said inductive elements from the respective output circuits to said source; said first and second gating circuit means being responsive to a clock pulse to discharge the inductive element conducting electrical current into the respective transistor for triggering the flip-flop circuit means.

3. A flip-flop circuit arrangement comprising: flip-flop circuit means having bistable states including a first transistor and a second transistor; logical input circuit means comprising an amplifier having a single input circuit and first and second output circuits, said amplifier being responsive to low and high potential level logical signals coupled to said single input circuit to produce an electrical current in said first or second output circuit, respectively; first and second gating circuit means coupling said first and second output circuits to said first and second transistors, respectively, each of said gating circuit means including an inductive network having a predetermined time constant including an inductor coupled to the respective one of said output circuits for passing said electrical current and thereby storing energy in response to said electrical current to produce a triggering signal current capable of turning off the respective transistor during discharge and a resistive element also coupled to the respective one of said output circuits to provide an alternate current path for the electrical current supplied from the respective one of said output circuits of said amplifier; and gating pulse input circuit means coupling said inductors to a source of gating pulses for providing a primary current path for the electrical current through each of said inductors from the respective output circuits between gating pulses and blocking said primary path during gating pulses whereby energy stored in either one inductor or the other inductor due to interruption of said electrical current is discharged during the gating pulses to produce a triggering signal current turning off the respective transistor and placing the flip-flop circuit means in the bistable state corresponding to the low or high potential level of logical signals coupled to said single input circuit.

4. A logical circuit arrangement comprising: a plurality of flip-flop circuit means each including a first transistor and a second transistor, and flip-flop outputs; differential amplifier circuit means for each flip-flop circuit means having a single input and first and second outputs, said differential amplifier being responsive to true and false logical signals coupled to said single input to produce an electrical current in said first or second differential amplifier output, respectively; logical circuit means interconnecting said flip-flop circuit outputs and said differential amplifier inputs to perform logical operations; first and second clock gating circuit means for each flip-flop circuit means separately coupling said first and second differential amplifier outputs to said first and second transistors, respectively, each of said clock gating circuit means comprising an inductive network including an inductor and a resistive element; a source of clock pulses; clock pulse circuit means connecting said inductors to said source of clock pulses for blocking the current path through each of said inductors to said source from the respective differential amplifier outputs during clock pulses, whereby energy stored in either one inductor or the other inductor of each flip-flop circuit means is discharged into the respective transistor for triggering the respective flip-flop into a true or false state according to the logical signals coupled to the respective differential amplifier input in the time interval immediately prior to each clock pulse.

5. A flip-flop circuit arrangement comprising: flip-flop circuit means having true and false states including a first transistor and a second transistor; logical input circuit means having a single input and first and second outputs, said logical input circuit means being responsive to low potential level logical signals coupled to said single input to produce an electrical current in said first output and responsive to high potential level logical signals coupled to said input to produce an electrical current in said second output; a gating pulse input; and first and second gating circuit means separately connecting the first and second outputs to said first and second transistors respectively for producing triggering signals for changing the state of said flip-flop circuit means, each of said gating circuits including a network having a time constant determined by the minimum time period required to turn off the respective transistor and turn on the other transistor to retain the flip-flop circuit means in the triggered state, said first gating circuit network including an inductive element connecting said first output to said gating pulse input to provide a primary current path through said inductive element for said electrical current from said first output and storing energy for producing a triggering signal during discharge which is capable of turning off said first transistor and a resistive element coupled to said inductive element to provide an alternate current path for said electrical current from said first output, said second gating circuit network including an inductive element connecting said second output to said gating pulse input to provide a primary current path through said latter inductive element for said electrical current from said second output and storing energy for producing a triggering signal during discharge which is capable of turning off said second transistor and a resistive element coupled to said latter inductive element to provide an alternate current path for said electrical current from said second output.

6. A flip-flop circuit arrangement comprising: flip-flop circuit means having true and false states including a first transistor having a base, emitter, and collector which is conducting current when the flip-flop is in a false state and a second transistor having a base, emitter, and collector which is conducting current when the flip-flop is in a true state; logical input circuit means having a single input and first and second outputs, said logical input circuit means being responsive to true logical signals coupled to said single input to produce an electrical current in said first output and responsive to false logical signals coupled to said input to produce an electrical current in said second output; and first and second clock gating circuit means individually connecting the first and second outputs to the bases of said first and second transistors, respectively, for producing triggering signals for changing the state of said flip-flop in response to said electrical current and a clock pulse, each of said clock gating circuits including an inductive-resistive network having a time constant which is predetermined by the minimum time period required to turn off the respective transistor and turn on the other transistor to retain the flip-flop in the triggered state, said first clock gating circuit comprising a first inductive-resistive network including an inductive element connecting said first output to a clock pulse input to provide a primary current path through said inductive element for said electrical current supplied from said first output and storing energy for producing a triggering signal during discharge which is capable of turning off said first transistor and connecting said first output to said first transistor and a resistive element coupled to said first output and to said inductive element to provide an alternate current path for said electrical current supplied from said first output, said second clock gating circuit comprising a second inductive-resistive network including an inductive element connecting said second output to the clock pulse input to provide a primary current path through said inductive element in said second network for said electrical current supplied from said second output and storing energy for producing a triggering signal during discharge which is capable of turning off said second transistor and connecting said second output to said second transistor and a resistive element coupled to said second output and to said inductive element in said second network to provide an alternate current path for said electrical current supplied from said second output.

7. A flip-flop circuit arrangement comprising: flip-flop circuit means including a first transistor and a second transistor; first and second gating circuit means, each of said gating circuit means having a logical signal input and including an inductive network coupling said logical signal input to a respective one of said first and second transistors, each of said networks including an inductive element for passing logical signal currents; switching circuit means for completing current paths through each of said inductive elements to respective ones of said logical inputs and repeatedly blocking said current paths to sample the logical signals at said inputs for controlling the state of said flip-flop circuit means wherein the time period of blocking of the current paths is substantially equal to the time required for turning off one of the transistors and turning on the other one of the transistors; said first and second gating circuit means being responsive to said blocking of said current paths to discharge one of the inductive elements that is conducting electrical current prior to blocking said current paths whereby the discharge is made into the respective one of said first and second transistors for triggering the flip-flop circuit means.

8. A flip-flop circuit arrangement according to claim 7 in which the time period of blocking is substantially equal to the time period required to turn off either one or the other of the transistors which is operating in saturation and to turn on the other one of the transistors.

9. A flip-flop circuit arrangement comprising: flip-flop circuit means having bistable states including a first transistor and a second transistor; first and second gating circuit means for coupling logical signal currents coupled to inputs thereof to produce logical signal currents in either one or the other of the corresponding first and second gating circuit means, each of said gating circuit means including an inductive network coupled to a respective one of said first and second transistors, each of said networks having a predetermined time constant and including an inductor coupled to the respective one of said inputs for passing said logical signal currents and thereby building up a magnetic field and storing energy in response to said currents to produce a triggering signal current capable of turning off the respective one of said first and second transistors during discharge, and a resistive element also coupled to the respective one of said inputs to provide an alternate current path for said logical signal currents; and gating pulse input circuit means coupling said inductors to a source of gating pulses for providing primary current paths for the logical signal currents through each of said inductors between gating pulses and blocking said primary current paths during gating pulses whereby energy stored in either one inductor or the other inductor due to interruption of said logical signal currents is discharged during the gating pulses to produce triggering signal currents turning off the respective one of said first and second transistors and placing the flip-flop circuit means in the bistable state corresponding to the logical signal currents.

References Cited in the file of this patent

UNITED STATES PATENTS 2,706,811 Steele ------------------- Apr. 19, 1955

OTHER REFERENCES

Richards: Digital Computer Components and Circuits, D. Van Nostrand, 1959 (pages 117, 119 relied on).

Millman et al.: Pulse and Digital Circuits, McGraw-Hill, 1956 (page 117 relied on).